US008339425B2

(12) United States Patent
Shin et al.

(10) Patent No.: US 8,339,425 B2
(45) Date of Patent: Dec. 25, 2012

(54) METHOD OF DRIVING PIXELS AND DISPLAY APPARATUS FOR PERFORMING THE METHOD

(75) Inventors: Byung-Hyuk Shin, Seoul (KR); Hyoung-Sik Nam, Incheon (KR)

(73) Assignee: Samsung Display Co., Ltd., Yongin (KR)

( * ) Notice: Subject to any disclaimer, the term of this patent is extended or adjusted under 35 U.S.C. 154(b) by 700 days.

(21) Appl. No.: 12/414,107

(22) Filed: Mar. 30, 2009

(65) Prior Publication Data

US 2009/0309867 A1 Dec. 17, 2009

(30) Foreign Application Priority Data

Jun. 17, 2008 (KR) ........................ 10-2008-0056810

(51) Int. Cl.
*G09G 5/10* (2006.01)
*G09G 5/00* (2006.01)
*G09G 3/36* (2006.01)
*G06F 3/038* (2006.01)

(52) U.S. Cl. .......... 345/690; 345/204; 345/208; 345/89; 345/94

(58) Field of Classification Search .................. 345/204, 345/690, 208, 209, 89, 94, 96
See application file for complete search history.

(56) References Cited

U.S. PATENT DOCUMENTS 5,373,378 A * 12/1994 Takubo et al. .................. 349/33
2006/0055648 A1* 3/2006 Kamada et al. .................. 345/87
2008/0180427 A1* 7/2008 Nishimura .................... 345/209

FOREIGN PATENT DOCUMENTS

JP 2006084860 3/2006
KR 1020060089831 8/2006
KR 1020060111262 10/2006

* cited by examiner

*Primary Examiner* — Bipin Shalwala
*Assistant Examiner* — Ilana Spar
(74) *Attorney, Agent, or Firm* — H.C. Park & Associates, PLC

(57) ABSTRACT

A pixel is driven by first converted image data having a first polarity and being converted by an A-gamma curve during an $(N)^{th}$ frame where 'N' is a natural number. The pixel is driven by second converted image data having a second polarity opposite to the first polarity and being converted using the A-gamma curve during an $(N+1)^{th}$ frame. The pixel is driven by third converted image data having the first polarity and being converted using a B-gamma curve different from the A-gamma curve during an $(N+2)^{th}$ frame. The pixel is driven by fourth converted image data having the second polarity and being converted by the B-gamma curve during an $(N+3)^{th}$ frame.

18 Claims, 7 Drawing Sheets

METHOD OF DRIVING PIXELS AND DISPLAY APPARATUS FOR PERFORMING THE METHOD

CROSS REFERENCE TO RELATED APPLICATION

This application claims priority from and the benefit of Korean Patent Application No. 10-2008-0056810, filed on Jun. 17, 2008, which is hereby incorporated by reference for all purposes as if fully set forth herein.

BACKGROUND OF THE INVENTION

1. Field of the Invention

The present invention relates to a method for driving pixels and a display apparatus for performing the method. More particularly, the present invention relates to a method of driving pixels that may increase a viewing angle and a display apparatus for performing the method.

2. Discussion of the Background

Generally, a liquid crystal display (LCD) device may have many advantages including being thin and having low electric power consumption. Therefore, LCD devices may be used in monitors, laptop computers, cellular phones, and large televisions.

An LCD device includes an LCD panel to display an image using the light transmittance of liquid crystal molecules and a backlight assembly disposed under the LCD panel to provide the LCD panel with light. The LCD panel includes a plurality of pixels arranged in a matrix form to display an image.

In order to increase the viewing angle, each pixel of the LCD panel may include a first pixel electrode and a second pixel electrode such that voltage levels applied to the first and second pixel electrodes are different from each other. However, when each pixel includes the first pixel electrode and the second pixel electrode, a patterning process for forming the first and second pixel electrodes may become more complicated and the aperture ratio may be reduced.

Recently, a time division voltage-applying method to increase the viewing angle has been developed to solve the above-mentioned problems. In the time division voltage-applying method a first voltage and a second voltage lower than the first voltage are sequentially applied to the same pixel in each frame, thereby increasing the viewing angle.

However, when a voltage applied to the pixel is inverted in each frame, voltages applied to pixels having the same polarity have the same voltage level, even though the pixels are driven by the time division voltage-applying method. Accordingly, afterimages may occur.

SUMMARY OF THE INVENTION

The present invention provides a method of driving pixels that may increase a viewing angle and prevent afterimages.

The present invention also provides a display apparatus for performing the above-mentioned method.

Additional features of the invention will be set forth in the description which follows, and in part will be apparent from the description, or may be learned by practice of the invention.

The present invention discloses a method of driving pixels. In the method, a first pixel is driven by first converted image data having a first polarity during an $(N)^{th}$ frame where 'N' is a natural number. The first converted image data is converted using an A-gamma curve. During an $(N+1)^{th}$ frame, the first pixel is driven by second converted image data having a second polarity opposite to the first polarity. The second converted image data is converted using the A-gamma curve. During an $(N+2)^{th}$ frame, the first pixel is driven by third converted image data having the first polarity. The third converted image data is converted using a B-gamma curve that is different from the A-gamma curve. During an $(N+3)^{th}$ frame, the first pixel is driven by fourth converted image data having the second polarity. The fourth converted image data is converted using the B-gamma curve.

In one example embodiment of the present invention, a second pixel adjacent to the first pixel may be driven by fifth converted image data having the second polarity during the (N)-th frame. The fifth converted image data is converted by the B-gamma curve. During the (N+1)-th frame, the second pixel may be driven by sixth converted image data having the first polarity. The sixth converted image data is converted by the B-gamma curve. During the (N+2)-th frame, the second pixel may be driven by seventh converted image data having the second polarity. The seventh converted image data is converted by the A-gamma curve. During the (N+3)-th frame, the second pixel may be driven by eighth converted image data having the first polarity. The eighth converted image data is converted by the A-gamma curve.

In one example embodiment of the present invention, the first pixel may be a first sub-pixel that is one of a red sub-pixel, a green sub-pixel and a blue sub-pixel, and the second pixel may be a second sub-pixel adjacent to the first sub-pixel. Alternatively, the first pixel may be a first unit pixel that is one of a red unit pixel, a green unit pixel and a blue unit pixel, and the second pixel may be a second unit pixel adjacent to the first unit pixel.

In one example embodiment of the present invention, the B-gamma curve may have a characteristic that converts input image data into converted image data to display a relatively dark image compared to the A-gamma curve.

In one example embodiment of the present invention, the first pixel may be driven at a frequency in the range of about 60 Hz to about 240 Hz.

The present invention also discloses a display apparatus including a gamma memory, a timing controller, and a display unit. The gamma memory stores information related to an A-gamma curve and information related to a B-gamma curve that is different from the A-gamma curve. The timing controller receives input image data whose polarity is inverted in each frame from an external device and the information related to the A-gamma and B-gamma curves from the gamma memory. The timing controller converts the input image data into converted image data in an A-gamma curve, A-gamma curve, B-gamma curve, B-gamma curve sequence in each frame and outputs the converted image data. The display unit receives the converted image data from the timing controller, and has a plurality of pixels to display an image in response to the converted image data.

In one example embodiment of the present invention, the timing controller may convert first input image data having a first polarity into first converted image data to drive a first pixel of the display unit using the A-gamma curve during an (N)-th frame, and second input image data having a second polarity opposite to the first polarity into second converted image data to drive the first pixel using the A-gamma curve during an (N+1)-th frame (wherein 'N' is a natural number). Further, the timing controller may convert third input image data having the first polarity into third converted image data to drive the first pixel using the B-gamma curve during an (N+2)-th frame, and fourth input image data having the second polarity into fourth converted image data to drive the first pixel using the B-gamma curve during an (N+3)-th frame.

In one example embodiment of the present invention, the timing controller may further convert fifth input image data having the second polarity into fifth converted image data to drive a second pixel adjacent to the first pixel using the B-gamma curve during the (N)-th frame, and sixth input image data having the first polarity into sixth converted image data to drive the second pixel using the B-gamma curve during the (N+1)-th frame. Further, the timing controller may convert seventh input image data having the second polarity into seventh converted image data to drive the second pixel using the A-gamma curve during the (N+2)-th frame, and eighth input image data having the first polarity into eighth converted image data to drive the second pixel using the A-gamma curve during the (N+3)-th frame.

In one example embodiment of the present invention, the B-gamma curve may have a characteristic that converts input image data into converted image data to drive a relatively dark image compared to the A-gamma curve.

In one example embodiment of the present invention, the timing controller may receive an image control signal from an external device, and output a gate control signal and a data control signal to the display unit in response to the image control signal.

In one example embodiment of the present invention, the display unit may include a gate driving part, a data driving part and a display panel. The gate driving part receives the gate control signal from the timing controller, and outputs a gate signal in response to the gate control signal. The data driving part receives the data control signal and the converted image data from the timing controller, and outputs a data signal in response to the gate control signal and the converted image data. The display panel receives the gate signal and the data signal from the gate driving part and the data driving part, respectively, and the display panel is driven by the gate signal and the data signal to display the image.

The present invention also discloses a method of driving pixels. In the method, a first pixel is driven by first converted image data having a first polarity during an $(N)^{th}$ frame where 'N' is a natural number. The first converted image data is converted using an A-gamma curve. During an $(N+1)^{th}$ frame, the first pixel is driven by second converted image data having the first polarity. The second converted image data is converted using a B-gamma curve that is different from the A-gamma curve. During an $(N+2)^{th}$ frame, the first pixel is driven by third converted image data having a second polarity opposite to the first polarity. The third converted image data is converted using the A-gamma curve. During an $(N+3)^{th}$ frame, the first pixel is driven by fourth converted image data having the second polarity. The fourth converted image data is converted using the B-gamma curve.

In one example embodiment of the present invention, a second pixel adjacent to the first pixel may be driven by fifth converted image data having the second polarity during the (N)-th frame. The fifth converted image data is converted by the B-gamma curve. During the (N+1)-th frame, the second pixel may be driven by sixth converted image data having the second polarity. The sixth converted image data is converted by the A-gamma curve. During the (N+2)-th frame, the second pixel may be driven by seventh converted image data having the first polarity. The seventh converted image data is converted by the B-gamma curve. During the (N+3)-th frame, the second pixel may be driven by eighth converted image data having the first polarity. The eighth converted image data is converted by the A-gamma curve.

In one example embodiment of the present invention, the B-gamma curve may have a characteristic that converts input image data into converted image data to display a relatively dark image compared to the A-gamma curve.

In one example embodiment of the present invention, the first pixel may be driven at a frequency in the range of about 60 Hz to about 240 Hz.

The present invention discloses a display apparatus includes a gamma memory, a timing controller, and a display unit. The gamma memory stores information related to an A-gamma curve and information related to a B-gamma curve different from the A-gamma curve. The timing controller receives input image data whose polarity is inverted every two frames from an external device and the information related to the A-gamma curve and the B-gamma curve from the gamma memory. The timing controller converts the input image data into converted image data in an A-gamma curve and the B-gamma curve in each frame and outputs the converted image data. The display unit receives the converted image data from the timing controller and has a plurality of pixels to display an image in response to the converted image data.

In one example embodiment of the present invention, the timing controller may convert first input image data having a first polarity into first converted image data to drive a first pixel of the display unit using the A-gamma curve during an (N)-th frame, and second input image data having the first polarity into second converted image data to drive the first pixel using the B-gamma curve during an (N+1)-th frame (wherein 'N' is a natural number). Further, the timing controller may convert third input image data having a second polarity opposite to the first polarity into third converted image data to drive the first pixel using the A-gamma curve during an (N+2)-th frame, and fourth input image data having the second polarity into fourth converted image data to drive the first pixel using the B-gamma curve during an (N+3)-th frame.

In one example embodiment of the present invention, the timing controller may further convert fifth input image data having the second polarity into fifth converted image data to drive a second pixel adjacent to the first pixel using the B-gamma curve during the (N)-th frame, and sixth input image data having the second polarity into sixth converted image data to drive the second pixel using the A-gamma curve during the (N+1)-th frame. Further, the timing controller may convert seventh input image data having the first polarity into seventh converted image data to drive the second pixel using the B-gamma curve during the (N+2)-th frame, and eighth input image data having the first polarity into eighth converted image data to drive the second pixel using the A-gamma curve during the (N+3)-th frame.

In one example embodiment of the present invention, the B-gamma curve may have a characteristic that converts input image data into converted image data to drive a relatively dark image compared to the A-gamma curve.

According to some example embodiments of the present invention, input image data whose polarity is inverted in each frame is converted in an A-A-B-B gamma curve sequence, or input image data whose polarity is inverted every two frames is converted in an A-B gamma curve sequence, to drive pixels. Therefore, afterimages of a display panel may be removed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
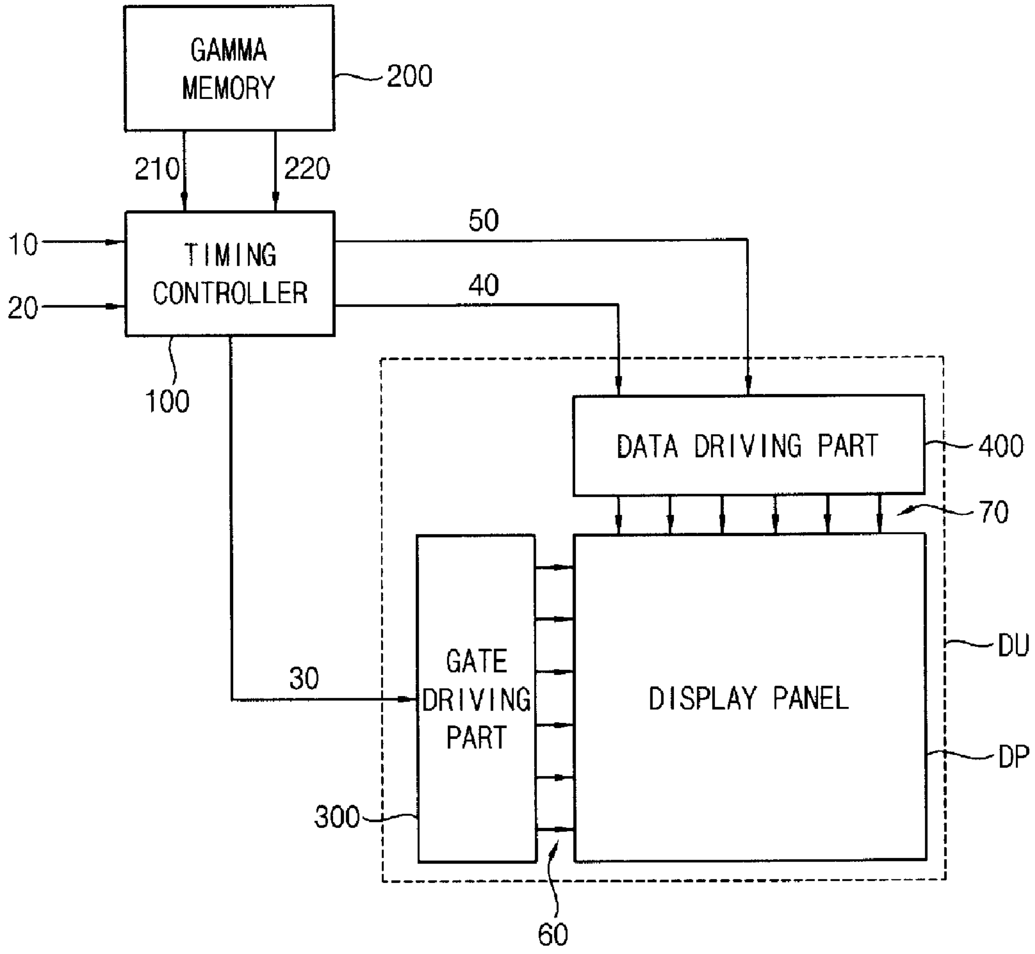
FIG. 1 is a block diagram conceptually showing a display apparatus in accordance with Exemplary Embodiment 1 of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to," or "coupled to" another element or layer, it can be directly on, connected to, or coupled to the other element or layer or intervening elements or layers may be present. In contrast, when an element is referred to as being "directly on," "directly connected to," or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section.

Spatially relative terms, such as "beneath," "below," "lower," "above," "upper," and the like, may be used herein for ease of description to describe one element or feature's relationship to another element(s) or feature(s) as shown in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions shown herein but are to include deviations in shapes that result, for example, from manufacturing. Thus, the regions shown in the figures are schematic in nature and their shapes are not intended to show the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Exemplary Embodiment 1

Figure 2:
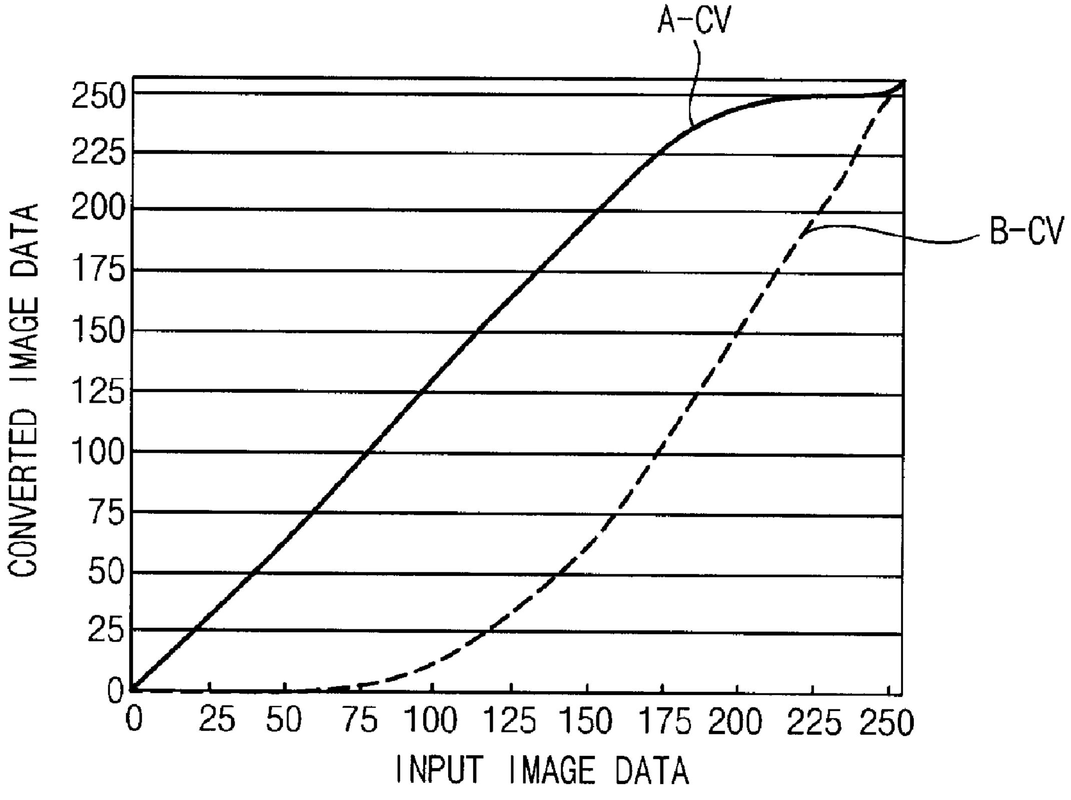
FIG. 2 is a graph showing an A-gamma curve and a B-gamma curve stored in the gamma memory of FIG. 1.

FIG. 1 is a block diagram conceptually showing a display apparatus in accordance with Exemplary Embodiment 1 of the present invention. FIG. 2 is a graph showing an A-gamma curve and a B-gamma curve stored in the gamma memory of FIG. 1.

Referring to FIG. 1 and FIG. 2, a display apparatus in accordance with Exemplary Embodiment 1 includes a timing controller 100, a gamma memory 200, and a display unit DU.

The timing controller 100 receives input image data 10 and an image control signal 20 from an external image board (not shown) in one frame. The timing controller 100 receives an A-conversion signal 210 and a B-conversion signal 220 from the gamma memory 200. The timing controller 100 outputs a gate control signal 30 and a data control signal 40 to the display unit DU in response to the image control signal 20. The timing controller 100 converts the input image data 10 into converted image data 50 using the A-conversion signal 210 or the B-conversion signal 220, and outputs the converted image data 50 to the display unit DU.

The gamma memory 200 stores information related to an A-gamma curve (A-CV) and information related to a B-gamma curve (B-CV). The gamma memory 200 stores the information related to the A-gamma curve (A-CV) in a format of an A-conversion table and the information related to the B-gamma curve (B-CV) in a format of a B-conversion table.

The B-gamma curve (B-CV) has a characteristic that converts the input image data 10 into converted image data to display a relatively dark image compared to the A-gamma curve (A-CV). That is, the A-gamma curve (A-CV) is related to a low gradation (i.e., black) image, and the B-gamma curve (B-CV) is related to a high gradation (i.e., white) image.

The gamma memory 200 outputs the A-conversion signal 210 having information related to the A-gamma curve (A-CV) and the B-conversion signal 220 having information related to the B-gamma curve (B-CV) to the timing controller 100.

The timing controller 100 successively receives the input image data 10 from an external device. The polarity of the input image 10 may be inverted in each frame. The timing controller 100 converts the input image data 10 into the converted image data 50 to display an image in the display unit DU, using the A-conversion signal 210, which relates to the A-gamma curve (A-CV) or the B-conversion signal 220, which relates to the B-gamma curve (B-CV).

The timing controller 100 converts the input image data 10 in an A-gamma curve (A-CV), A-gamma curve (A-CV), B-gamma curve (B-CV), B-gamma curve (B-CV) sequence (hereinafter referred to as "A-A-B-B gamma curve sequence").

The display unit DU may include a gate driving part 300, a data driving part 400, and a display panel DP.

The gate driving part 300 receives the gate control signal 30 from the timing controller 100 and outputs a gate signal 60 to the display panel DP in response to the gate control signal 30. The data driving part 400 receives the data control signal 40 and the converted image data 50 from the timing controller 100 and outputs a data signal 70 to the display panel DP in response to the data control signal 40 and the converted image data 50.

The display panel DP receives the gate signal 60 and the data signal 70 from the gate driving part 300 and the data driving part 400, respectively, and displays an image using the gate and data signals 60 and 70.

Figure 3:
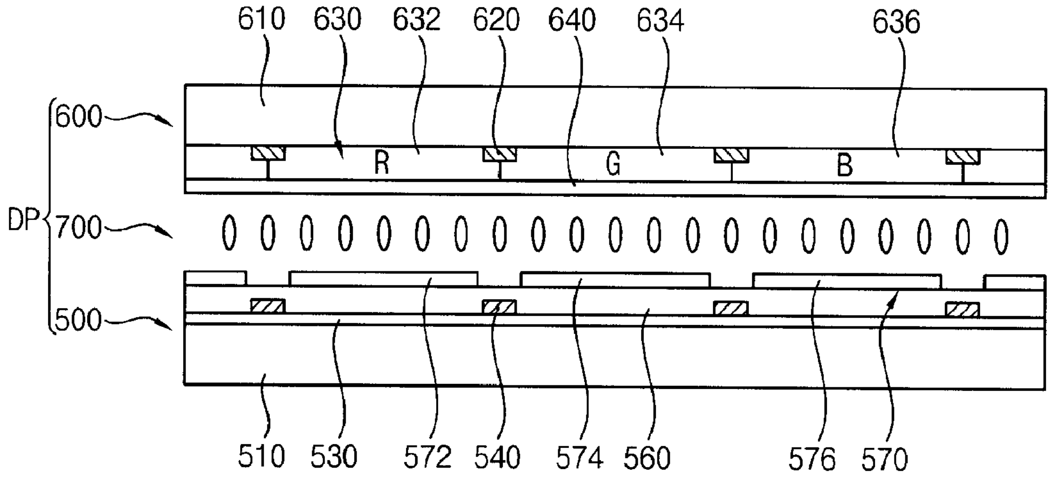
FIG. 3 is a cross-sectional view showing a portion of a display panel of the display unit in FIG. 1.
Figure 4:
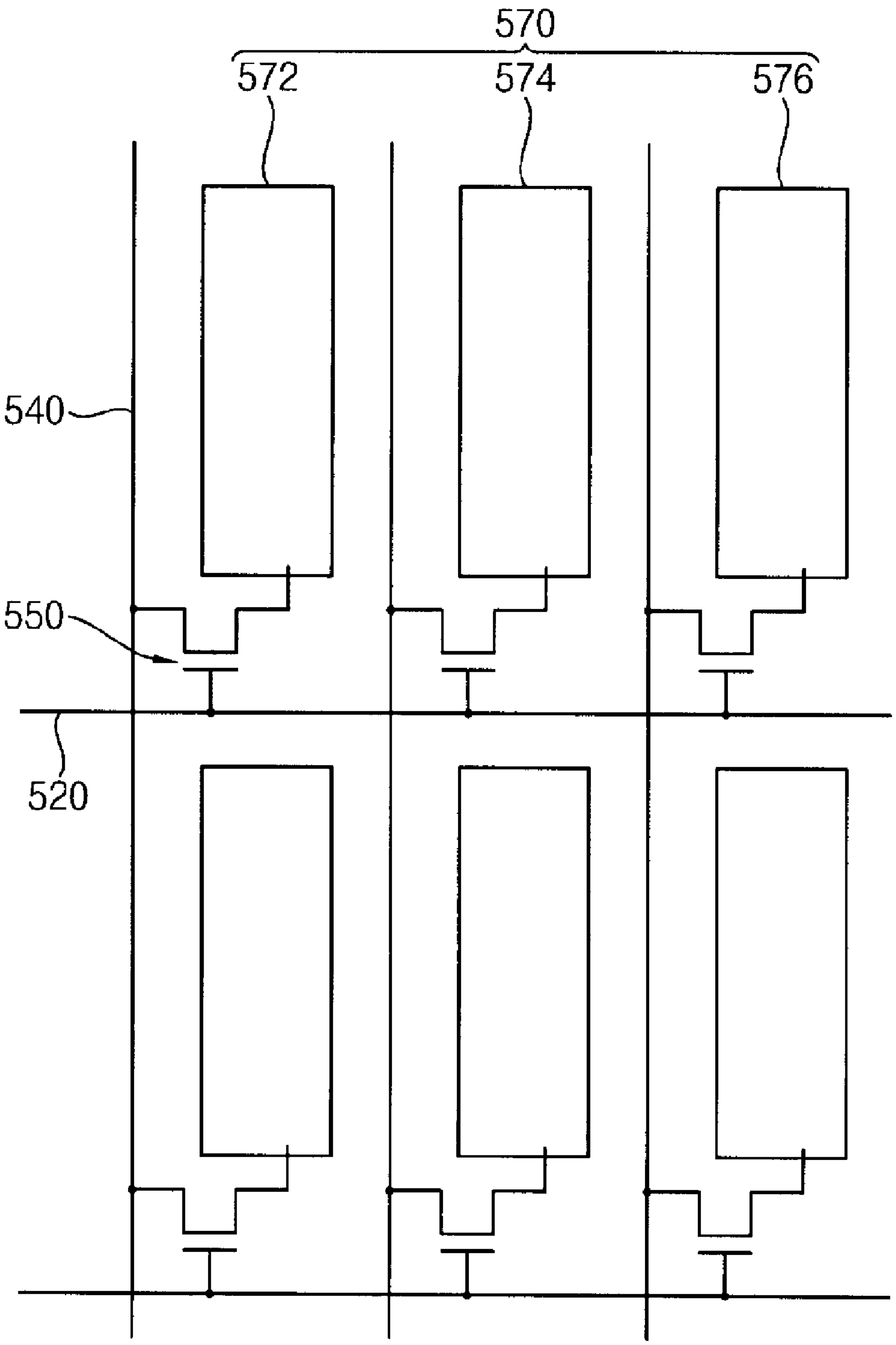
FIG. 4 is a circuit diagram showing a first substrate of the display panel in FIG. 3.

FIG. 3 is a cross-sectional view showing a portion of a display panel of the display unit in FIG. 1. FIG. 4 is a circuit diagram showing a first substrate of the display panel in FIG. 3.

Referring to FIG. 3 and FIG. 4, the display panel DP includes a first substrate 500, a second substrate 600, and a liquid crystal layer 700.

The first substrate 500 may include a first transparent substrate 510, a plurality of gate lines 520, a gate insulation layer 530, a plurality of data lines 540, a plurality of thin-film transistors (TFTs) 550, a passivation layer 560, and a plurality of pixel electrodes 570.

The gate lines 520 are formed on the first transparent substrate 510 along a first direction. The gate insulation layer 530 is formed on the first transparent substrate 510 to cover the gate lines 520. The data lines 540 are formed on the gate insulation layer 530 along a second direction substantially perpendicular to the first direction. Each TFT 550 is formed adjacent to a crossing of the gate lines 520 and the data lines 540. The TFTs 550 may be connected to the gate lines 520 and the data lines 540. The passivation layer 560 is formed on the gate insulation layer 530 to cover the data lines 540 and the TFTs 550.

The pixel electrodes 570 are formed on the passivation layer 560 and are connected to the TFTs 550 through contact holes (not shown) in the passivation layer 560. For example, the pixel electrodes 570 may be formed in each unit region defined by the gate lines 520 and the data lines 540. The pixel electrodes 570 may include a transparent conductive material.

The second substrate 600 includes a second transparent substrate 610, a shading pattern 620, a plurality of color filters 630, and a common electrode 640.

The shading pattern 620 is formed on the second transparent substrate 610 to block light. The shading pattern 620 may be disposed to cover the gate lines 520, the data lines 540, and the TFTs 550.

The color filters 630 are formed on the second transparent substrate 610 corresponding to the pixel electrodes 570. The color filters 630 may include a red color filter 632, a green color filter 634, and a blue color filter 636 that are disposed adjacent to each other. The color filters 630 may alternatively be formed on the first transparent substrate 510.

The common electrode 640 is formed on the color filters 630. The common electrode 640 may include a transparent conductive material that is substantially the same as that of the pixel electrodes 570.

Figure 5:
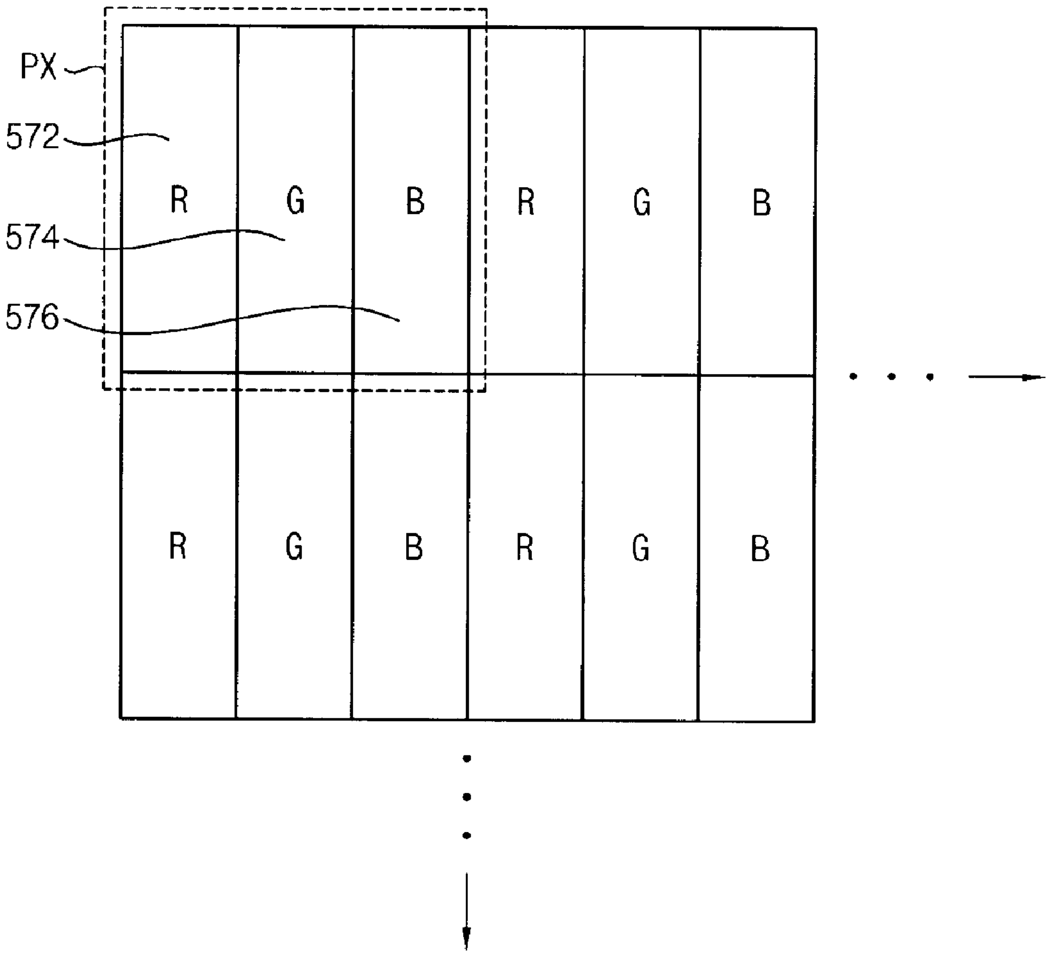
FIG. 5 is a plan view showing a portion of pixels of the display panel in FIG. 3.

FIG. 5 is a plan view showing a portion of pixels of the display panel in FIG. 3.

Referring to FIG. 3 and FIG. 5, the pixel electrodes 570 may be arranged in a red sub-pixel 572 corresponding to the red color filter 632, a green sub-pixel 574 corresponding to the green color filter 634, and a blue sub-pixel 576 corresponding to the blue color filter 636.

The pixel electrodes 570 are divided into a plurality of unit pixels PX disposed in a format of a matrix. Each of the unit pixels PX may include three sub-pixels, that is, the red, green, and blue sub-pixels 572, 574, and 576.

Figure 6:
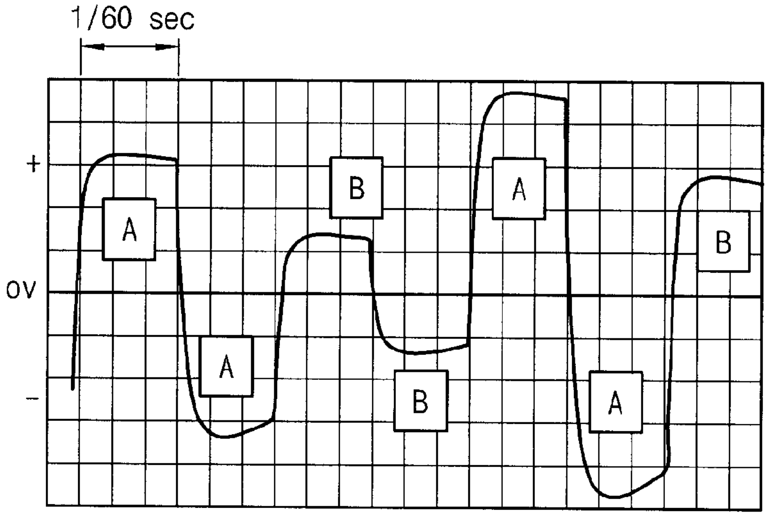
FIG. 6 is a graph showing a method of driving pixels in accordance with Exemplary Embodiment 1.

FIG. 6 is a graph showing a method of driving pixels in accordance with Exemplary Embodiment 1.

Referring to FIG. 1, FIG. 5, and FIG. 6, the timing controller 100 converts the input image data 10 applied from an external device in the A-A-B-B gamma curve sequence to generate the converted image data 50.

For example, during an $(N)^{th}$ frame, the timing controller 100 converts first input image data having a first polarity into first converted image data for driving a first pixel of the display panel DP using the A-gamma curve (A-CV). 'N' is a natural number.

During an $(N+1)^{th}$ frame, the timing controller 100 converts second input image data having a second polarity that is an inverted polarity of the first polarity to second converted image data to drive the first pixel using the A-gamma curve (A-CV). The first polarity may be positive, and the second polarity may be negative.

During an $(N+2)^{th}$ frame, the timing controller 100 converts third input image data having the first polarity into third converted image data to drive the first pixel using the B-gamma curve (B-CV).

During an $(N+3)^{th}$ frame, the timing controller 100 converts fourth input image data having the second polarity into fourth converted image data to drive the first pixel using the B-gamma curve (B-CV).

Further, during the $(N)^{th}$ frame, the timing controller 100 may convert fifth input image data having the second polarity into fifth converted image data to drive a second pixel adjacent to the first pixel using the B-gamma curve (B-CV).

During the $(N+1)^{th}$ frame, the timing controller 100 may convert sixth input image data having the first polarity into sixth converted image data to drive the second pixel using the B-gamma curve (B-CV).

During the $(N+2)^{th}$ frame, the timing controller 100 may convert seventh input image data having the second polarity into seventh converted image data to drive the second pixel using the A-gamma curve (A-CV).

During the $(N+3)^{th}$ frame, the timing controller 100 may convert eighth input image data having the first polarity into eighth converted image data to drive the second pixel using the A-gamma curve (A-CV).

The first to eighth converted image data converted by the timing controller 100 are converted into first to eighth data signals, respectively. The first to fourth data signals successively drive the first pixel, and the fifth to eighth data signals successively drive the second pixel.

In one exemplary embodiment, the first and second pixels are driven at a frequency in the range of about 60 Hz to about 240 Hz. For example, the first and second pixels may be driven at a frequency of 60 Hz, 120 Hz, or 240 Hz. A waveform in the graph shown in FIG. 6 is an example when the first and second pixels are driven in a frequency of 60 Hz.

Figure 7:
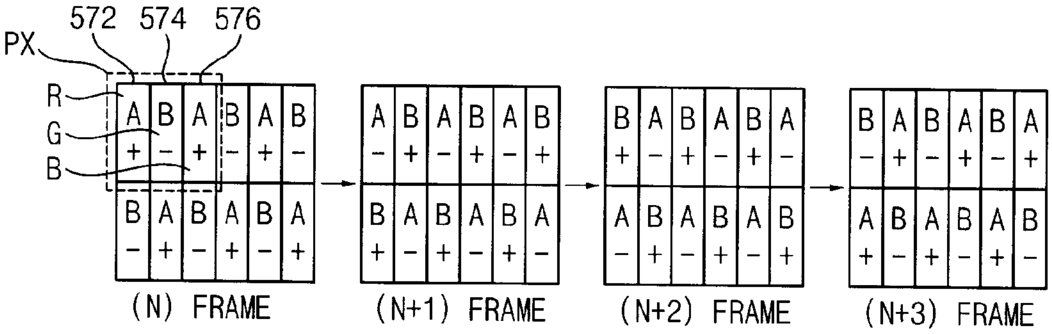
FIG. 7 and FIG. 8 are plan views showing a method of driving pixels shown in FIG. 4.
Figure 8:
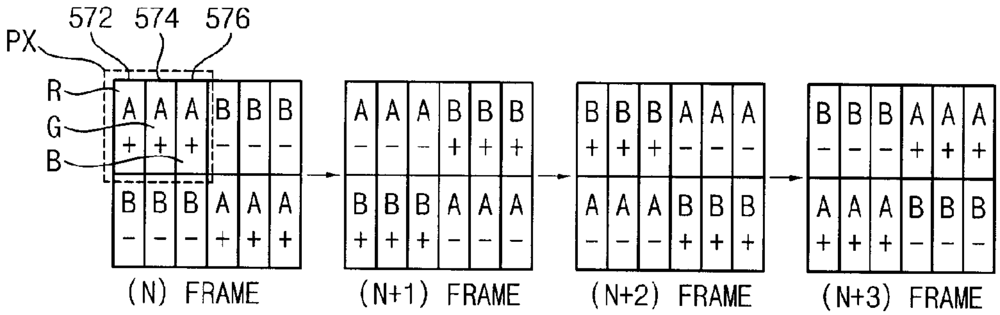

FIG. 7 and FIG. 8 are plan views showing a method of driving pixels shown in FIG. 4.

Referring to FIG. 1, FIG. 4, FIG. 6, and FIG. 7, the first pixel may be a first sub-pixel that is one of the red, green, and blue sub-pixels 572, 574, and 576, and the second pixel may be a second sub-pixel adjacent to the first sub-pixel.

For example, when the first pixel is a red sub-pixel 572, the second pixel may be a green sub-pixel 574 adjacent to the red sub-pixel 572. Alternatively, when the first pixel is a red sub-pixel 572, the second pixel may be another red sub-pixel adjacent to the red sub-pixel 572.

Sub-pixels adjacent to each other may be driven by converted image data converted by different gamma curves and having different polarities.

Referring to FIG. 1, FIG. 4, FIG. 6, and FIG. 8, the first pixel may be a first unit pixel including the red, green, and blue sub-pixels 572, 574, and 576, and the second pixel may be a second unit pixel adjacent to the first unit pixel.

For example, when the first unit pixel is driven by converted image data converted using the A-gamma curve (A-CV) and having a positive polarity, the second unit pixel is driven by converted image data converted using the B-gamma curve (B-CV) and having a negative polarity.

In FIG. 8, three sub-pixels in one unit pixel PX have the same polarity. That is, the sub-pixels are driven according to a three-dot inversion driving method. Alternatively, three sub-pixels in one unit pixel PX may have different polarities. That is, the sub-pixels may be driven according to a one-dot inversion driving method.

Hereinafter, referring to FIG. 1, FIG. 2, FIG. 3, FIG. 4, FIG. 5, FIG. 6, FIG. 7, and FIG. 8, a method of driving pixels in accordance with Exemplary Embodiment 1 of the present invention will be described.

During an $(N)^{th}$ frame, a first pixel is driven by first converted image data converted by an A-gamma curve (A-CV) and having a first polarity, and a second pixel adjacent to the first pixel is driven by fifth converted image data converted by a B-gamma curve (B-CV) that is different from the A-gamma curve (A-CV) and has a second polarity opposite to the first polarity. 'N' is a natural number.

The first polarity is positive and the second polarity is negative. The B-gamma curve (B-CV) may have a characteristic that converts input image data into converted image data to display a relatively dark image compared to the A-gamma curve (A-CV).

During an $(N+1)^{th}$ frame, the first pixel is driven by second converted image data converted using the A-gamma curve (A-CV) and having the second polarity, and the second pixel is driven by sixth converted image data converted using the B-gamma curve (B-CV) and having the first polarity.

During an $(N+2)^{th}$ frame, the first pixel is driven by third converted image data converted using the B-gamma curve (B-CV) and having the first polarity, and the second pixel is driven by seventh converted image data converted using the A-gamma curve (A-CV) and having the second polarity.

During an $(N+3)^{th}$ frame, the first pixel is driven by fourth converted image data converted using the B-gamma curve (B-CV) and having the second polarity, and the second pixel is driven by eighth converted image data converted using the A-gamma curve (A-CV) and having the first polarity.

In this exemplary embodiment, the first pixel is a first sub-pixel that is one of red, green, and blue sub-pixels 572, 574, and 576, and the second pixel is a second sub-pixel adjacent to the first sub-pixel. Alternatively, the first pixel may be a first unit pixel including the red, green, and blue sub-pixels 572, 574, and 576, and the second pixel is a second unit pixel adjacent to the first unit pixel.

The first and second pixels may be driven at a frequency in a range of about 60 Hz to about 240 Hz. For example, the first and second pixels may be driven at a frequency of 60 Hz, 120 Hz, or 240 Hz.

According to Exemplary Embodiment 1, input image data whose polarity is inverted in each frame is converted in the A-A-B-B gamma curve sequence into converted image data, and pixels of a display panel are driven by the converted image data, so that afterimages may be prevented.

Exemplary Embodiment 2

Figure 9:
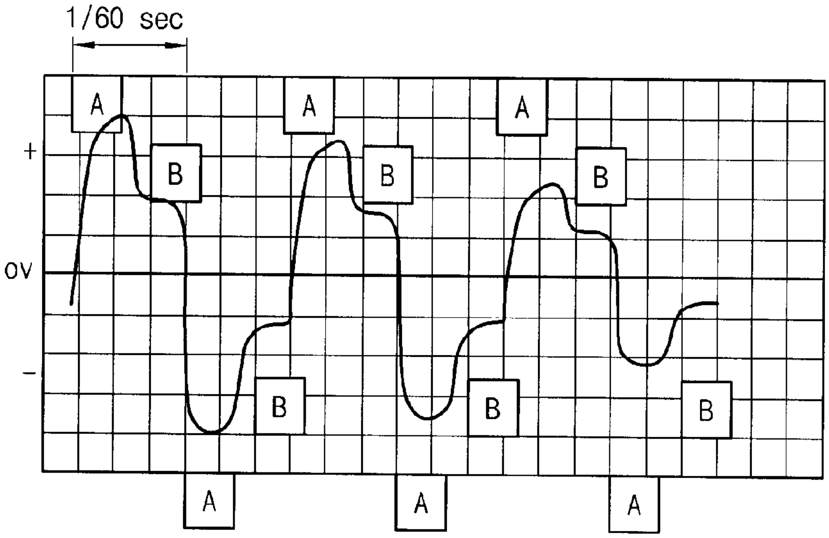
FIG. 9 is a graph showing a method of driving pixels in accordance with Exemplary Embodiment 2.

FIG. 9 is a graph showing a method of driving pixels in accordance with Exemplary Embodiment 2.

The display apparatus described in Exemplary Embodiment 2 with reference to FIG. 9 may be substantially the same as the display apparatus of Exemplary Embodiment 1 described with reference to FIG. 1, FIG. 2, FIG. 3, FIG. 4, FIG. 5, FIG. 6, FIG. 7, and FIG. 8 except a function of a timing controller. Therefore, the same reference numbers are used for the same or similar elements, and any further descriptions concerning the same or similar elements as those described in FIG. 1, FIG. 2, FIG. 3, FIG. 4, FIG. 5, FIG. 6, FIG. 7, and FIG. 8 will be omitted.

Referring to FIG. 1, FIG. 2, FIG. 3, FIG. 4, FIG. 5, and FIG. 9, a timing controller 100 in accordance with Exemplary Embodiment 2 receives input image data 10 and an image control signal 20 from an external image board (not shown) in one frame. The timing controller 100 receives an A-conversion signal 210 and a B-conversion signal 220 from a gamma memory 200.

The timing controller 100 outputs a gate control signal 30 and a data control signal 40 to the display unit DU in response to the image control signal 20. The timing controller 100 converts the input image data 10 into converted image data 50 using the A-conversion signal 210 or the B-conversion signal 220, and outputs the converted image data 50 to the display unit DU.

The timing controller 100 receives the input image data 10 from an external device. The polarity of the input image 10 may be inverted every two frames. The timing controller 100 converts the input image data 10 into the converted image data 50 in an A-gamma curve (A-CV), B-gamma curve (B-CV) sequence (hereinafter referred to as "A-B gamma curve sequence"), in which the A-gamma curve (A-CV) and the B-gamma curve (B-CV) are alternated in each frame, and outputs the converted image data 50. The B-gamma curve (B-CV) may have a characteristic that converts input image data into converted image data to display a relatively dark image compared to the A-gamma curve (A-CV).

For example, during an (N)th frame, the timing controller 100 converts first input image data having a first polarity into first converted image data to drive a first pixel of the display panel DP using the A-gamma curve (A-CV). 'N' is a natural number.

During an (N+1)th frame, the timing controller 100 converts second input image data having the first polarity into second converted image data to drive the first pixel using the B-gamma curve (B-CV).

During an (N+2)th frame, the timing controller 100 converts third input image data having a second polarity that is an inverted polarity of the first polarity into third converted image data to drive the first pixel using the A-gamma curve (A-CV). The first polarity may be positive, and the second polarity may be negative.

During an (N+3)th frame, the timing controller 100 converts fourth input image data having the second polarity into fourth converted image data to drive the first pixel using the B-gamma curve (B-CV).

Further, during the (N)th frame, the timing controller 100 may convert fifth input image data having the second polarity into fifth converted image data to drive a second pixel adjacent to the first pixel using the B-gamma curve (B-CV).

During the (N+1)th frame, the timing controller 100 may convert sixth input image data having the second polarity into sixth converted image data to drive the second pixel using the A-gamma curve (A-CV).

During the (N+2)th frame, the timing controller 100 may convert seventh input image data having the first polarity into seventh converted image data to drive the second pixel using the B-gamma curve (B-CV).

During the (N+3)th frame, the timing controller 100 may convert eighth input image data having the first polarity into eighth converted image data to drive the second pixel using the A-gamma curve (A-CV).

In this exemplary embodiment, the first pixel is a first sub-pixel that is one of red, green, and blue sub-pixels 572, 574, and 576, and the second pixel is a second sub-pixel adjacent to the first sub-pixel. Alternatively, the first pixel may be a first unit pixel including the red, green, and blue sub-pixels 572, 574, and 576, and the second pixel is a second unit pixel adjacent to the first unit pixel.

The first and second pixels may be driven at a frequency in a range of about 60 Hz to about 240 Hz. For example, the first and second pixels may be driven at a frequency of 60 Hz, 120 Hz, or 240 Hz.

According to Exemplary Embodiment 2, input image data, which has polarity that is inverted every two frames, is converted in the A-B gamma curve sequence into converted image data, and pixels of a display panel are driven by the converted image data, so that afterimages may be prevented.

According to exemplary embodiments of the present invention, input image data whose polarity is inverted in each frame is converted in an A-A-B-B gamma curve sequence or input image data whose polarity is inverted every two frames is converted in an A-B gamma curve sequence, to drive pixels of a display panel.

Therefore, afterimages, which are generated when input image data whose polarity is inverted in each frame is converted in the A-B gamma curve sequence, may be prevented, so that the viewing angle of a displayed image may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for driving pixels, comprising:

directly receiving in a timing controller input image data, an image control signal, an A-conversion signal having an A-gamma curve, and a B-conversion signal having a B-gamma curve to convert the input image data into first, second, third and fourth converted image data based on the image control signal, the A-conversion signal, and the B-conversion signal, the B-gamma curve being different from the A-gamma curve;

driving a first pixel using the first converted image data having a first polarity during an $(N)^{th}$ frame, the first converted image data being converted using the A-conversion signal;

driving the first pixel using the second converted image data having a second polarity that is opposite to the first polarity during an $(N+1)^{th}$ frame, the second converted image data being converted using the A conversion signal;

driving the first pixel using the third converted image data having the first polarity during an $(N+2)^{th}$ frame, the third converted image data being converted using the B-conversion signal; and driving the first pixel using the fourth converted image data having the second polarity during an $(N+3)^{th}$ frame, the fourth converted image data being converted using the B-conversion signal, wherein 'N' is a natural number.

2. The method of claim 1, further comprising:

converting the input image data into fifth, sixth, seventh, and eighth converted image data based on the image control signal, the A-conversion signal, and the B-conversion signal;

driving a second pixel adjacent to the first pixel using the fifth converted image data having the second polarity during the $(N)^{th}$ frame, the fifth converted image data being converted using the B-conversion signal;

driving the second pixel using the sixth converted image data having the first polarity during the $(N+1)^{th}$ frame, the sixth converted image data being converted using the B-conversion signal;

driving the second pixel using the seventh converted image data having the second polarity during the $(N+2)^{th}$ frame, the seventh converted image data being converted using the A-conversion signal; and driving the second pixel using the eighth converted image data having the first polarity during the $(N+3)^{th}$ frame, the eighth converted image data being converted using the A-conversion signal.

3. The method of claim 2, wherein the first pixel is a first sub-pixel that is one of a red sub-pixel, a green sub-pixel, and a blue sub-pixel, and the second pixel is a second sub-pixel adjacent to the first sub-pixel.

4. The method of claim 2, wherein the first pixel is a first unit pixel that is one of a red unit pixel, a green unit pixel and a blue unit pixel, and the second pixel is a second unit pixel adjacent to the first unit pixel.

5. The method of claim 1, wherein the B-gamma curve has a characteristic that converts input image data into converted image data to display a relatively dark image compared to the A-gamma curve.

6. The method of claim 1, wherein the first pixel is driven at a frequency in the range of 60 Hz to 240 Hz.

7. A display apparatus, comprising:

a gamma memory to store information related to an A-gamma curve and information related to a B-gamma curve different from the A-gamma curve;

a timing controller to receive input image data whose polarity is inverted in each frame from an external device, an image control signal from the external device, to directly receive an A-conversion signal corresponding to the information related to the A-gamma curve from the gamma memory and a B-conversion signal corresponding to the information related to the B-gamma curve from the gamma memory, and to convert the input image data into converted image data in the A-gamma curve, the A-gamma curve, the B-gamma curve, the B-gamma curve sequence in each frame based on the image control signal, the A-conversion signal, and the B-conversion signal to output the converted image data; and a display unit to receive the converted image data from the timing controller, the display unit having a plurality of pixels to display an image in response to the converted image data, wherein a polarity of the image data is inverted in each frame.

8. The display apparatus of claim 7, wherein the timing controller converts:

first input image data having a first polarity into first converted image data to drive a first pixel of the display unit using the A-conversion signal during an $(N)^{th}$ frame;

second input image data having a second polarity opposite to the first polarity into second converted image data to drive the first pixel using the A-conversion signal during an $(N+1)^{th}$ frame;

third input image data having the first polarity into third converted image data to drive the first pixel using the B-conversion signal during an $(N+2)^{th}$ frame; and fourth input image data having the second polarity into fourth converted image data to drive the first pixel using the B-conversion signal during an $(N+3)^{th}$ frame, wherein 'N' is a natural number.

9. The display apparatus of claim 8, wherein the timing controller further converts:

fifth input image data having the second polarity into fifth converted image data to drive a second pixel adjacent to the first pixel using the B-conversion signal during the $(N)^{th}$ frame;

sixth input image data having the first polarity into sixth converted image data to drive the second pixel using the B-conversion signal during the $(N+1)^{th}$ frame;

seventh input image data having the second polarity into seventh converted image data to drive the second pixel using the A-conversion signal during the $(N+2)^{th}$ frame; and eighth input image data having the first polarity into eighth converted image data to drive the second pixel using the A-conversion signal during the $(N+3)^{th}$ frame.

10. The display apparatus of claim 7, wherein the B-gamma curve has a characteristic that converts input image data into converted image data to display a relatively dark image compared to the A-gamma curve.

11. The display apparatus of claim 7, wherein the timing controller receives the image control signal from an external device, and outputs a gate control signal and a data control signal to the display unit in response to the image control signal.

12. The display apparatus of claim 11, wherein the display unit comprises:

a gate driving part to receive the gate control signal from the timing controller, and output a gate signal in response to the gate control signal;

a data driving part to receive the data control signal and the converted image data from the timing controller, and output a data signal in response to the gate control signal and the converted image data; and a display panel to receive the gate signal and the data signal from the gate driving part and the data driving part, respectively, the display panel being driven by the gate signal and the data signal to display the image.

13. A method for driving pixels, the method comprising:

receiving input image data, an image control signal, an A-conversion signal having an A-gamma curve, and a B-conversion signal having a B-gamma curve to convert the input image data into first, second, third, fourth, fifth, sixth, seventh, and eighth converted image data based on the image control signal, the A-conversion signal, and the B-conversion signal, the B-gamma curve being different from the A-gamma curve;

driving a first pixel using the first converted image data having a first polarity during an $(N)^{th}$ frame, the first converted image data being converted using the A-conversion signal;

driving the first pixel using the second converted image data having the first polarity during an $(N+1)^{th}$ frame, the second converted image data being converted using a B-gamma curve different from the A-conversion signal;

driving the first pixel using the third converted image data having a second polarity opposite to the first polarity during an $(N+2)^{th}$ frame, the third converted image data being converted using the A-conversion signal; and driving the first pixel using the fourth converted image data having the second polarity during an $(N+3)^{th}$ frame, the fourth converted image data being converted using the B-conversion signal, driving a second pixel adjacent to the first pixel using the fifth converted image data having the second polarity during the $(N)^{th}$ frame, the fifth converted image data being converted using the B-conversion signal;

driving the second pixel using the sixth converted image data having the second polarity during the $(N+1)^{th}$ frame, the sixth converted image data being converted using the A-conversion signal;

driving the second pixel using the seventh converted image data having the first polarity during the $(N+2)^{th}$ frame, the seventh converted image data being converted using the B-conversion signal; and driving the second pixel using the eighth converted image data having the first polarity during the $(N+3)^{th}$ frame, the eighth converted image data being converted using the A-conversion signal, wherein 'N' is a natural number, and wherein a pixel immediately adjacent to the first pixel and in the same row as the first pixel, and a pixel immediately adjacent to the first pixel and in the same column as the first pixel, are both second pixels.

14. The method of claim 13, wherein the B-gamma curve has a characteristic that converts input image data into converted image data to display a relatively dark image compared to the A-gamma curve.

15. The method of claim 13, wherein the first pixel is driven at a frequency in the range of 60 Hz to 240 Hz.

16. A display apparatus, comprising:

a gamma memory to store information related to an A-gamma curve and information related to a B-gamma curve different from the A-gamma curve;

a timing controller to receive input image data, an image control signal from an external device, to directly receive an A-conversion signal corresponding to the information related to the A-gamma curve from the gamma memory and a B-conversion signal corresponding to the information related to the B-gamma curve from the gamma memory, to convert the input image data into converted image data in the A-gamma curve, the B-gamma curve sequence in each frame based on the image control signal, the A-conversion signal, and the B-conversion signal, and to output the converted image data; and a display unit to receive the converted image data from the timing controller, the display unit having a plurality of pixels to display an image in response to the converted image data, wherein the timing controller converts:

first input image data having a first polarity into first converted image data to drive a first pixel of the display unit using the A-conversion signal during an $(N)^{th}$ frame;

second input image data having the first polarity into second converted image data to drive the first pixel using the B-conversion signal during an $(N+1)^{th}$ frame;

third input image data having a second polarity opposite to the first polarity into third converted image data to drive the first pixel using the A-conversion signal during an $(N+2)^{th}$ frame;

fourth input image data having the second polarity into fourth converted image data to drive the first pixel using the B-conversion signal during an $(N+3)^{th}$ frame;

fifth input image data having the second polarity into fifth converted image data to drive a second pixel adjacent to the first pixel using the B-conversion signal during the $(N)^{th}$ frame;

sixth input image data having the second polarity into sixth converted image data to drive the second pixel using the A-conversion signal during the $(N+1)^{th}$ frame;

seventh input image data having the first polarity into seventh converted image data to drive the second pixel using the B-conversion signal during the $(N+2)^{th}$ frame; and eighth input image data having the first polarity into eighth converted image data to drive the second pixel using the A-conversion signal during the $(N+3)^{th}$ frame, and wherein a pixel immediately adjacent to the first pixel and in the same row as the first pixel, and a pixel immediately adjacent to the first pixel and in the same column as the first pixel, are both second pixels.

17. The display apparatus of claim 16, wherein the B-gamma curve has a characteristic that converts input image data into converted image data to display a relatively dark image compared to the A-gamma curve.

18. The method of claim 2, wherein a pixel immediately adjacent to the first pixel and in the same row as the first pixel, and a pixel immediately adjacent to the first pixel and in the same column as the first pixel, are both second pixels.

* * * * *